(12) United States Patent
Cayrefourcq

(10) Patent No.: US 6,212,319 B1
(45) Date of Patent: Apr. 3, 2001

(54) ELECTRO-OPTICAL DEVICE, NOTABLY FOR OPTICAL DISTRIBUTION

(75) Inventor: Ian Cayrefourcq, Paris (FR)

(73) Assignee: Dassault Electronique, Saint Cloud (FR)

( * ) Notice: Subject to any disclaimer, the term of this patent is extended or adjusted under 35 U.S.C. 154(b) by 0 days.

(21) Appl. No.: 09/190,707

(22) Filed: Nov. 12, 1998

(30) Foreign Application Priority Data

Nov. 27, 1997 (FR) .................................................. 97 14939

(51) Int. Cl.⁷ ...................................................... G02B 6/26
(52) U.S. Cl. ................ 385/40; 385/14; 385/27; 385/28; 385/41; 385/131; 385/132
(58) Field of Search .................. 385/14, 15, 27, 385/28, 29, 31, 40, 41, 42, 129, 130, 131, 132

(56) References Cited

U.S. PATENT DOCUMENTS

| | | | |
|---|---|---|---|
| 3,920,314 | * 11/1975 | Yajima | 385/40 X |
| 4,035,058 | * 7/1977 | Papuchon | 385/40 X |
| 4,761,049 | * 8/1988 | Burns et al. | 385/40 X |
| 5,119,449 | 6/1992 | Komatsu et al. | 385/8 |
| 5,237,629 | * 8/1993 | Hietala et al. | 385/3 |
| 5,283,842 | * 2/1994 | Hakogi et al. | 385/3 |
| 5,408,566 | 4/1995 | Eda et al. | 385/131 |
| 5,555,326 | * 9/1996 | Hwang et al. | 385/2 |

FOREIGN PATENT DOCUMENTS 2173621    7/1990    (JP) ....................................  385/40 X

OTHER PUBLICATIONS

M. Schienle, G. Wenger, S. Eichinger, J. Müller, L. Stoll and G. Müller, "One by eight InP/InGaAsP optical matrix switch with low insertion and high cross–talk suppression", IEEE Journal of Lightwave technology, vol. 14 No. 5, May 1995.

* cited by examiner

Primary Examiner—Brian Healy
(74) Attorney, Agent, or Firm—Christie, Parker & Hale, LLP

(57) ABSTRACT

A multilayer structure (S,1–3) is surmounted by parallel primary lines (4-1, 4-2) which define, in the regions situated below them, waveguides operating according to a first propagation mode. At least one electro-optical control means (E-1) is placed at a selected location between each pair of primary lines and, under certain conditions, enables the local existence of a second propagation mode affecting the two regions together, so that the transfer of the first mode between the two guides which enclose it can be controlled by acting on the second mode. This makes it possible to produce an energy distributor based on a so-called "cascade" architecture.

16 Claims, 1 Drawing Sheet

ELECTRO-OPTICAL DEVICE, NOTABLY FOR OPTICAL DISTRIBUTION

BACKGROUND OF THE INVENTION

The invention relates to devices suitable for use in optoelectronics, particularly those capable of distributing a propagating mode for a light wave between a plurality of pathways.

Devices of this kind are used particularly in the field of telecommunications where it is frequently necessary to transfer a light wave carrying data from one pathway (wave-guide) to one or more other pathways. The term transfer here refers to switching in which the light wave is integrally switched from one pathway to another, or an operation comprising distributing the light wave between at least two pathways. Optoelectronic components are particularly well adapted to this type of function as there is little space available and moreover the electricity consumption is limited.

Optical devices are already known, generally based on semiconductors, which operate by switching either by adiabatic transformation of modes of the light wave (known by the acronyms DOS or COSTA), or by total internal reflection (known by the English acronym TIR), or again by mode coupling (known by the English acronym EODC).

The invention relates more specifically to devices of the latter type (EODC), more particularly those which have a multilayer structure surmounted by two at least partially parallel primary lines arranged to define, in two regions, straight with the primary lines, two waveguides operating according to a first propagation mode, as well as electro-optical control means placed at a chosen location to vary the coupling between the two waveguides.

A device of this kind is described notably in the publication by M. Schienle, G. Wenger, S. Eichinger, J. Müller, L. Stoll and G. Müller, "One by eight InP/InGaAsP optical matrix switch with low insertion and high cross-talk suppression", IEEE Journal of Lightwave technology, vol 14 No. 5, May 1995. It comprises more precisely a first line segment defining a first wave guide the "exit" end of which is enclosed by the "entry" ends of two other line segments, also defining waveguides and covered with a metallized portion forming the current supply electrode. The three line segments are parallel to one another. To transfer a wave from the first guide to one of the entrances of the other two guides at least one of the two electrodes has to be supplied with current.

Owing to its 1×2-type architecture, a device of this kind rapidly becomes a large consumer of current when the number of waveguides becomes substantial. Moreover, this device does not allow the wave to be distributed over two guides until the two electrodes placed at the end of the waveguide through which the lightwave arrives are supplied with current, thereby increasing the current consumption still further. Moreover, the wave initially circulating in the first waveguide cannot remain in it given that the line which defines it is broken off substantially level with the entrances of the two guides which frame it. As a result the device becomes bulky as it requires a "1×2"-type architecture for each waveguide through which a given wave arrives. Thus, in order to produce a switch of the 1×16 type, 4 levels of waveguide have to be used.

SUMMARY OF THE INVENTION

The invention therefore proposes to overcome all or some of the above-mentioned disadvantages.

To do this, it proposes an electro-optical device of the type comprising, in known manner, a multilayer structure surmounted by two at least partially parallel primary lines, and arranged to define in two regions two waveguides operating according to a first mode of propagation, and electro-optical control means placed at a location selected to vary the coupling between the two guides, the device being notable in that the electro-optical control means are placed between the two primary lines and arranged, on the one hand, to authorize locally a second propagation mode affecting the two regions together and, on the other hand, to control the transfer of the first mode between the two guides which enclose it, by acting principally on this second mode.

The term "multilayer structure" here denotes a stack comprising at least one so-called lower "confining" layer and a so-called upper "confining" layer placed on either side of a layer known as the "lightwave guiding" layer, the primary lines being placed on the upper confining layer, opposite the guide layer, and the materials and dimensions of the primary layers and lines being selected so as to define, substantially straight with the primary lines, two waveguides operating according to a first propagation mode.

From now on, a single electro-optical control means will be sufficient to pass a light wave from a first guide to a second nearby guide without the need to switch off said first guide. This makes it possible to produce a so-called "cascade" structure in which the electricity consumption and bulk are reduced.

Preferably, the first and second propagation modes of the light wave are of the symmetrical and antisymmetrical types, respectively, coupling between these two modes taking place when their total gives a nonzero contribution.

According to another feature of the invention, each electro-optical control means comprises an element which extends locally parallel to each of the primary lines which enclose it, in a region where they are parallel to each other, over a coupling length selected as a function of at least the wavelength of the lightwave and the actual optical indices of the structure in the regions of the waveguides, viewed by the first and second modes of this light wave, the indices being a function at least of the materials forming the structure and geometric characteristics of this structure.

More preferably, this coupling length is proportional to the ratio between the wavelength of the lightwave and a multiple of the difference between the effective optical indices of the structure in the regions of the waveguide, viewed respectively by the first mode and second mode of the lightwave.

According to yet another feature of the invention, each electro-optical control means is arranged to act on the second mode by reducing the effective optical indices of the structure, in the region which extends between the waveguides.

Thus, by adjusting the effective optical indices, it is possible to control the proportion of the lightwave which one wishes to transfer to an adjacent waveguide, or in other words the coupling between these two modes. This transfer or coupling may be partial or total.

Preferably, this reduction in the effective optical indices is achieved by injecting electric current (or in other words by "injection of carriers") into the electro-optical control means.

Even more preferably, in the event of exceeding a current intensity threshold, the transfer of the first mode of a waveguide towards the adjacent waveguide is prevented, whereas in the event of zero current intensity, the transfer of the first mode of a waveguide to the adjacent waveguide is automatic and virtually integral. Between these two current values, there will be a distribution of the lightwave between the waveguide through which the wave arrives and the adjacent waveguide in question, the distribution in each of the two waveguides naturally being a function of the intensity of the current injected.

In an embodiment in which the intensity of the electric control current can only assume the value zero and a value substantially greater than or equal to the threshold, the device acts as an "all or nothing" switch.

With the aim of avoiding crosstalk problems, the element of the electro-optical control means is advantageously formed in the selected location at distances from the two primary lines surrounding it which are selected so that this element finds itself placed closer to the primary line below which the part of the first mode is to be at least partially transferred than to the primary line below which the part of the first mode is at least partially extracted.

In a preferred embodiment of the element of the electro-optical control means, the latter is formed by a secondary line which extends parallel to each primary line surrounding it over the associated coupling length and surmounted by a metallized portion connected to electrical supply means adapted to control the intensity of the current injected into this element. Here, the element is thus produced using the same technology as the primary lines, so that this element itself locally defines a waveguide, in the region located below it.

According to another feature of the invention, all the lines, be they primary or secondary, are formed of a material substantially identical to the material forming the upper confining layer, thus substantially simplifying the process for manufacturing the device.

According to yet another feature of the invention, all the confining and guide layers and the primary and secondary lines are formed of semiconductor materials.

In this case, the confining layers are preferably made from a binary semiconductor material, particularly of the intrinsic InP type, the guide layer is preferably made from a quaternary semiconductor material lattice-matched to the binary material forming the confining layers, particularly of the intrinsic InGaAsP type, and the primary and secondary lines are preferably formed from binary semiconductor materials, particularly of the p doped InP type.

Moreover, in the case of a choice of semiconductor materials, the primary and secondary lines are preferably made using a technique selected from selective vapour- or gas-phase epitaxy, selective chemical attack and etching.

In the description which follows, provided by way of example, reference is made to the accompanying drawings, wherein:

DETAILED DESCRIPTION OF THE PREFERRED EMBODIMENTS

Figure 1:
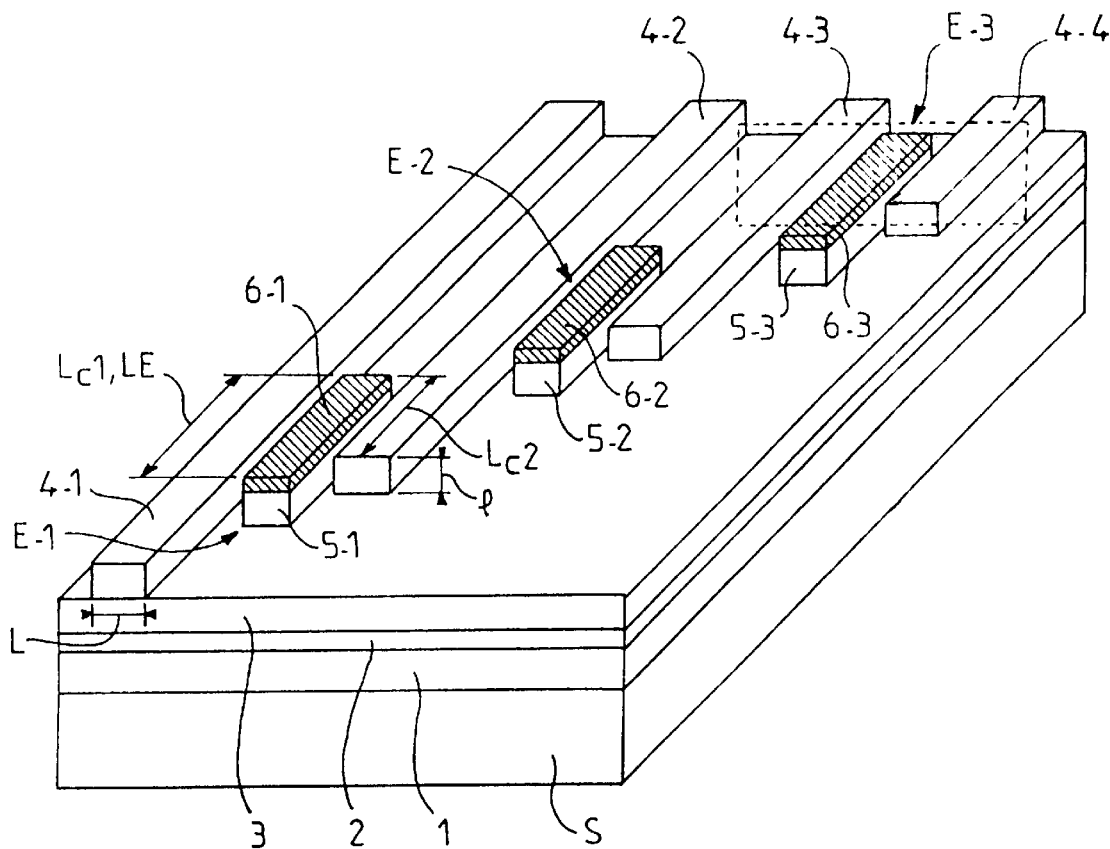
FIG. 1 diagrammatically shows a device according to the invention used in a first application for switching/distribution of type 1×4.
Figure 2:
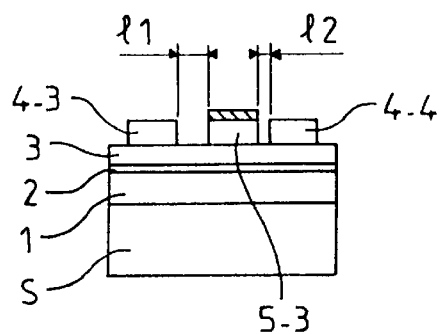
FIG. 2 is a sectional view of the part of the device in FIG. 1 surrounded by dotted lines.

FIGS. 1 and 2 diagrammatically show an electro-optical device according to the invention in a first, nonrestrictive embodiment. Here, the electro-optical device forms a switch/distributor of the "1×4" type which enables at least one output of four outputs to be supplied from one input.

In the following description, the device is constructed on the basis of a structure formed from a stack of layers which are preferably made from semiconductor materials. In fact, any multilayer structure which makes it possible to define waveguides which are substantially parallel to one another, at least in parts, and substantially in the same plane, may be envisaged provided that electro-optical control means according to the invention make it possible to control the transfer of a light wave from one waveguide to another waveguide.

In the example shown in FIGS. 1 and 2 (as well as 3 and 4) the structure comprises a first confining layer 1, preferably made from a binary material of the (non-doped) intrinsic InP type above which is placed a guide layer 2, preferably made from a quaternary material of the InGaAsP type lattice-matched to the guide material (in this case InP), and a second confining layer 3, also preferably made from a binary material of the intrinsic InP type. A structure of this kind would not of itself make it possible to define local (longitudinal) waveguides. To obtain such a result, the structure comprises, at selected points, here placed periodically above the second confining layer 3 of intrinsic InP, "primary" lines 4-i parallel to one another and preferably made from a binary material of the type used for the confining layers, namely InP, but in this case $p^+$ doped.

In fact, as is well known to those skilled in the art, by the local addition of a suitable material (in this case the primary lines 4-i) above a stack of two confining layers enclosing a guide layer, the effective optical index is modified in the region located below the suitable added material. A lightwave of selected wavelength λ may thus be confined in this region, substantially centered on the guide layer 2. Thus, straight with each primary line, a waveguide is defined wherein a lightwave and, more precisely, at least one first propagation mode thereof is able to propagate.

It is clear that the proportions used for the materials which constitute the layers and the primary lines, in this case indium, phosphorus, gallium and arsenic, as well as the respective thicknesses of the layers and the dimensions of the primary lines, are selected so as to enable local guiding of the light wave of selected wavelength λ.

As a nonrestrictive example, within the scope of guiding a lightwave of wavelength λ equal to 1.55 µm, the following thicknesses will be chosen for each layer of the structure:

first confining layer 1 of intrinsic InP: 0.6 microns;
guide layer 2 of InGaAsP (with a gap of 1.15 µm): 0.2 µm;
second confining layer 3 of intrinsic InP: 1.5 µm;
primary lines 4-i (i=1 to 4) of p+ doped InP: 0.6 µm.

Above the primary lines, 4-i, with a view to optimising the injection of carriers into the structure and hence improving ohmic contact, a terminal layer, preferably of a ternary material of the $p^+$ doped InGaAs type may be provided. In such a case, and in the example described, this layer is preferably 0.3 µm thick.

Moreover, in this example, the width L and height l of each primary line will be substantially equal to 4 µm and 1.8 µm, respectively, these primary lines 4-i being periodically spaced from one another by a distance of about 7 µm.

Preferably, again, in this example, the doping of the material forming the primary lines 4-i is of the order of $10^{18}$, while the doping of the material of the terminal layer of InGaAs is about $10^{19}$. The structure described previously is, again preferably, placed on a substrate S of $n^+$ doped InP.

Preferably, the different layers forming the structure, namely the confining layers 1 and 3, the guide layer 2 and the layer from which the primary lines 4-i are formed, are obtained by growth on a substrate A of InP using an epitaxy technique, e.g. molecular beam epitaxy (MBE) and more preferably gas source molecular beam epitaxy (GSMBE).

Of course, other types of growth may be envisaged, such as for example that obtained by metal-organic chemical vapour deposition (MOCVD).

It has already been pointed out that it was preferable for the primary lines to be formed from a "complete" layer using, for example, a technique of reactive ion etching (RIE) under oxygen plasma, or by selective chemical attack. However, it is clear that other techniques may be used such as for example selective epitaxy. In this case, it is obviously not appropriate to provide a complete layer for the primary lines.

The Applicants have noticed that by judiciously placing an electro-optical control element E-j (j=1 to 3 in FIG. 1) of predetermined dimensions at a location selected between two adjacent primary lines 4-i and 4-(i+1), it was possible to transfer a lightwave between the two waveguides defined by the primary lines 4-i and 4-(i+1). In other words, it is possible to control the complete transfer of the wave by providing an all-or-nothing switch, or to control partial transfer of this wave by providing an energy distributor.

In order to do this, the electro-optical element E-j must permit local propagation, i.e. propagation in the region above which it is located, of a second propagation mode of the lightwave affecting the two adjacent waveguides together. In fact, as is known to those skilled in the art, when two modes of propagation of a lightwave coexist in the same region, coupling of these modes may occur under certain conditions, inducing physical displacement of the first mode.

The electro-optical control element E-j must therefore define, like the primary lines 4-i, but under control, a local waveguide known as the "transfer" waveguide in the region located below it.

In the embodiment shown in the drawings, the electro-optical control element E-j is formed from a secondary line 5-j adapted to define a waveguide, like all the primary lines 4-i, at right angles thereto. Preferably, secondary lines 5-j of this kind are produced at the same time as the primary lines 4-i and hence using the same technique (etching, chemical attack or selective epitaxy) and the same materials, i.e. in the specific example illustrated, p+doped InP.

The width L and height l of each secondary line 5-j are substantially identical to those of the primary lines 4-i (in this example L=4 $\mu$m and l=1.8 $\mu$m). By contrast, their (longitudinal) extent parallel to the primary lines 4-i must without fail be equal to or greater than a whole number times the coupling length $L_c$ necessary for effective coupling between a waveguide defined by a primary line in which the lightwave circulates and an adjacent waveguide section defined by a secondary line, which will be used for transfer to an adjacent waveguide defined by an adjacent primary line. In fact, this length defines the minimum distance ensuring that two propagation modes, e.g. symmetrical and antisymmetrical, which consequently have different propagation velocities, will be able to be added together constructively.

This coupling length $L_c$ can be determined from equations of propagation of a light wave and more precisely its propagation modes. It is given by the following formula:

$$L_c = \frac{\lambda}{2(n_{even} - n_{odd})}$$

where $n_{even}$ and $n_{odd}$ respectively denote the effective optical indices of the first and second propagation modes of the lightwave of wavelength $\lambda$ in the waveguide. These two indices are a function particularly of the materials used to form the structure, the thicknesses of these materials and the geometric characteristics of the structure, including the spacing between waveguides.

It is important to note here that, given that the distance between a waveguide and the adjacent waveguide portion influences the coupling length $L_c$ between these two guides, the first coupling length $L_c1$ between a first guide and the adjacent guide portion, and the second coupling length $L_c2$ between a second guide adjacent to the first (and with which they enclose the guide portion) and said adjacent guide portion, will only be equal if said waveguide portion is arranged so as to be equidistant from the first and second waveguides.

In the example described in detail above and illustrated in FIG. 1, solely by way of example, the two coupling lengths $L_c1$ and $L_c2$ are not identical owing to the fact that the secondary line E-1 defining the waveguide portion is placed closer to the second primary line 4-2 than to the first primary line 4-1 (the reasons for this spacing will be explained hereinafter). Thus, a first coupling length $L_c1$=LE of about 800 $\mu$m is necessary for transferring the first symmetrical mode of the first waveguide, defined by the first primary line 4-1, to the transfer waveguide portion, defined by the first secondary line E-1, whereas a second coupling length $L_c2$ of about 600 $\mu$m is necessary for the transfer of the first symmetrical mode of the transfer waveguide portion (e-1) to the second waveguide, defined by the second primary line 4-2.

It is clear that the electro-optical element E-j made up of the sole secondary line 5-j automatically carries out the virtually integral transfer of the first mode of the wave from a first guide to a second guide without any need to act on this electro-optical element. However, if a true switch or, better still, an energy distributor is desired, it is necessary for the electro-optical element E-j to prevent the transfer of the lightwave, totally or partially, and consequently to prevent the coupling of its first and second modes, from one waveguide to the other.

Preferably, the controlling of the transfer (or coupling) is carried out by controlling the value of the effective optical indices of the structure in the region situated below the secondary line 5-j, viewed by the first and second modes.

To do this, it is particularly useful to inject an electric current into the secondary line 5-j, possibly a variable intensity current (if one wishes to produce an energy distributor), or in other words to inject carriers, e.g. electrons.

To achieve this objective, the upper surface (opposite the second confining layer 3) of each secondary line 5-j may be covered with an ohmic contact made of pt/ti/pt/Au, for example. An ohmic contact deposit may be obtained, for example, by a method comprising a lithography step followed by an evaporation step well known to those skilled in the art and therefore requiring no further description here. The ohmic contact of each element E-j is thus connected to a control module which is able to manage their respective power supplies via "electric cables", for example. Of course, a fully integrated device may also be envisaged in which the control module and the connections are integrated in the structure.

The injection of carriers into the secondary line 5-j, when it exceeds a predetermined threshold dependent on the materials which make up the structure, has the result of varying the effective optical indices in the region which extends between the two waveguides where it is located (and more particularly below), by a value such that the second mode of the lightwave can no longer be propagated there, thus preventing any coupling between the first and second modes.

When the intensity of the current injected into a secondary line 5-j via its ohmic contact 6-j is between zero and said predetermined threshold, it is then possible to monitor the amplitude of the coupling, so that the light wave can be distributed in the two guides enclosing the optical element in question. In this way an energy distributor is created.

It is clear that when the intensity of the current injected into the electro-optical modules E-j can only assume the value zero or a value greater than or equal to the predetermined threshold, the device operates as an all-or nothing-switch.

The electrical behaviour of the device or, in other words, the intensity necessary to control the transfer of a light wave between two adjacent guides can be deduced by solving the equations given below:

the Poisson equation (1):

$$\frac{\delta^2 V_x}{\delta x^2} = Nd - Na + p - n$$

equations of the charge-carrying currents (2):

$$j_n = -nv_n = \mu_n\left(nE_x + \frac{\delta n}{\delta x}\right)$$

$$j_p = +nv_p = \mu_p\left(pE_x - \frac{\delta p}{\delta x}\right)$$

$$j_t = j_n + j_p + \epsilon\frac{\delta E}{\delta t}$$

where the indices n and p denote, respectively, the carriers of the electron and hole types, n and p are, respectively, the densities of carriers of the electron and hole types, the j's denote carrier current densities, v and $\mu$ respectively denote the velocity and mobility of the carriers;
and continuity equations (3)

$$\frac{\delta n}{\delta t} = \frac{\delta J_n}{\delta x} + g - u, \text{ and } \frac{\delta p}{\delta t} = -\frac{\delta J_p}{\delta x} + g - l$$

where g and u respectively denote the generation and recombination levels (electron-hole) of the carriers; and where:

$$E_x = -\frac{\delta v_x}{\delta x}, \text{ and } u_v = \frac{np - ni^2}{\tau_n(p+ni) + \tau_p(n+ni)}$$

where ni denotes the carrier density in the intrinsic semiconductor and the $\tau$'s denote the recombination times of the carriers,
and by using the HUNSPERGER equation (4) which gives the carrier density as a function of the variation in the refractive index:

$$n - n_o = -\frac{1}{2}\frac{N^2\lambda^2 q^2}{n_o m^* \epsilon_o \pi^2 c^2}$$

where N denotes the carrier density, q the charge of the electron, $n_0$ denotes the initial optical index before the injection of carriers, m* denotes the effective mass of the electron.

Using a structure such as the one shown in FIG. 1, which is made up of four waveguides defined by four primary lines 4-1 to 4—4, and comprising between each pair of adjacent primary lines an electro-optical control element E-1 to E-3 connected to a control module (not shown), it is then possible, by injecting a light wave at the inlet to the first waveguide defined by the first primary line 4-1 (the entrance being indicated by an arrow) to transfer this light guide partially or totally from the first waveguide to the second and/or third and/or fourth, depending on whether carriers are injected into one or more electro-optical control elements 5-j and depending on the intensity of the injected current. Thus, if none of the three electro-optical control elements E-1 to E-3 is supplied with current, the wave injected into the first guide will re-emerge from the exit of the fourth guide defined by the fourth primary line 4—4. By contrast, if only the first secondary line 5-1 is not supplied with current, but only the second secondary line 5-2 is supplied with a current greater than or equal to the predetermined threshold, the lightwave will re-emerge from the exit end of the second waveguide defined by the second primary line 4-2.

A large number of other cases may be envisaged, depending on whether the intensity of the supply current to the electro-optical control elements E-j can be continuously regulated or whether it is of the binary type. Thus, in the first hypothesis, where the current intensity is adjustable, with the device shown in FIG. 1 one can envisage delivering four portions of the light wave which has entered through the first waveguide, at the four outlets of the four waveguides.

In the example shown in FIG. 1, the primary lines 4-i are not all of identical lengths, owing to the fact that the device is designed here to operate as a 1×4-type switch. However, it is clear that all the primary lines may be of substantially equivalent lengths, or else a number of them may be of a first length and a number of others may be of a second length, so that a light wave can be injected into the device at several different locations.

In one embodiment in which the four primary lines would have the same longitudinal extents and wherein one or more electro-optical control units E-j would be placed between each pair of primary lines 4-i, a 4×4 energy distributor could be produced, each entrance to the waveguides being capable of receiving the lightwave.

However, it is important to note that, with a view to obtaining a device in which the switching is "two-way", i.e. switching is possible from a first guide to a second and from the second to the first, it is preferable, if one wishes to use only one control element E-j (transfer guide), to place the secondary line at an equal distance from the two primary lines which enclose it.

However, such positioning has the disadvantage of creating crosstalk and consequently signal loss. To prevent this, it would be preferable locally to bend one of the two primary lines which enclose a secondary line just after this secondary line (and hence at the exit from the coupling zone), so that the two primary lines are spaced from one another. In other words, it is sufficient for the lines to be parallel to one another along the coupling length.

Nevertheless, in the structures where such symmetry is unnecessary, i.e. when switching need occur only in one direction, always the same one, it is preferable for the secondary line 5-j to be closer to the primary line 4-(i+1) into which the lightwave isY to be transferred than to the primary line 4-i wherein the lightwave to be transferred circulates. This makes it possible to improve the transfer and limit the crosstalk effects as far as possible.

This asymmetrical positioning of the secondary lines 5-j is better illustrated in FIG. 2 which shows the cross-sectional view of the structure at the part which is enclosed by dotted lines in FIG. 1.

In the example described in detail hereinbefore, the Applicants have found that it was advantageous for the secondary line 5-j to be twice as close to the primary line 4-(i+1) of the "receiver" guide than to the primary line 4-i of the "transmitter" guide. In fact, the optimum spacing of each of the two primary lines can be calculated from the above equations, in particular. These spacings depend chiefly on the amplitude of the optical confinement induced by the presence of the primary and secondary lines and consequently by their height l. For example, again with reference to the device described in detail hereinbefore, the value chosen for the first spacing 11 will be about 2 µm and the value for the second spacing 12 will be about 1 µm.

It is clear that numerous alternative embodiments of the device described may be envisaged. Thus, several (at least two) transfer control elements (E-j) may be placed between one or more pairs of adjacent primary lines 4-i and 4-(i+1) so that one or more lightwaves can be transferred from one guide to the other and vice versa. Without doubt, an embodiment of this kind requires a plurality of primary lines extending over the full length of the device, so that the wave or waves can be introduced into the structure at several points. This would make it possible, for example, to mix the lightwave coming from a first waveguide with a second lightwave coming from another waveguide.

The invention is not restricted to the embodiments described hereinbefore with reference to the drawings, but covers all the alternatives which might be developed by the skilled person within the scope of the claims which follow.

Thus, the number and dimensions of the waveguides as well as the number and positions of the various electro-optical control means may vary depending on the particular application.

Furthermore, a device is described in which only one layered structure was provided, but it is plain that it would be possible to superimpose a number of structures on one another, e.g. by burying the primary and secondary lines using suitable material, so as to form a multilevel device with a high degree of integration.

Moreover, a device is described in which the materials which form the layers of the structure were semiconductors, but plainly the invention is not limited to these materials alone. Thus, one might envisage the use of polymers such as PMMA or PMGI or even dielectric materials such as $SiO_2$.

Finally as indicated above, it would be possible to superimpose a number of structures the respective materials of which were not identical from one structure to the next, in order to allow the treatment (switching/distribution) of lightwaves of different wavelengths.

What is claimed is:

1. Electro-optical device of the type having a structure comprising at least:

one lower confining layer (1) and one upper confining layer (3) placed on either side of a lightwave guiding layer (2), two at least partially parallel primary lines (4-1,4-2) placed on the upper confining layer (3), opposite the guide layer (2), the materials and dimensions of these layers and primary lines being chosen so as to define, substantially straight with the primary lines (4-i), two waveguides operating according to a first propagation mode, and electro-optical control means (E-1) placed at a selected location in order to vary the coupling between the two guides, characterised in that the electro-optical control means (E-1) are placed between the two primary lines (4-1, 4-2) and arranged, on the one hand, to permit locally a second propagation mode affecting both waveguides together and, on the other hand, to control the transfer of the first mode between the two waveguides which enclose it, by acting chiefly on this second mode.

2. Electro-optical device according to claim 1, characterised in that each electro-optical control means comprises an element (E-j) which extends parallel to each of the primary lines (4-i) which enclose it, in a region where they are substantially parallel to one another, over a coupling length ($L_c$) selected as a function at least of the wavelength of the lightwave and the effective optical indices of the structure in the regions of the waveguides, viewed by the first and second modes of said lightwave, said indices being a function at least of the materials forming said structure and the geometric characteristics of this structure.

3. Electro-optical device according to claim 2, characterised in that the coupling length ($L_c$) is proportional to the ratio between the wavelength ($\lambda$) of the lightwave and a multiple of the difference between the effective optical indices of the structure in the regions of the waveguides, viewed respectively by the first mode and the second mode of the lightwave.

4. Electro-optical device according to claim 1, wherein the electro-optical control means are adapted to act on the second mode by reducing the effective optical indices of the structure, in the region which extends between said waveguides.

5. Electro-optical device according to claim 4, wherein the reduction in the indices is carried out by injecting electric current into said electro-optical control means.

6. Electro-optical device according to claim 5, wherein in the event that a current intensity threshold is exceeded, the first mode cannot be transferred from one waveguide to the adjacent waveguide, and in the event of zero current intensity, the first mode is transferred substantially integrally from one waveguide to the adjacent waveguide.

7. Electro-optical device according the claim 6, wherein the intensity of the electric monitoring current can only assume the value zero and a value greater than the threshold, so that the device operates as an "all or nothing" type switch.

8. Electro-optical device according to claim 2, wherein the element of the electro-optical control means is formed at the selected place at distances from the two primary lines which enclose it chosen so that said element is located closer to the primary line below which the part of the first mode has to be transferred at least partially than to the primary line below which the part of the first mode is at least partially extracted.

9. Electro-optical device according to one of claims 2 to 8, characterised in that the element of the electro-optical control means (E-j) comprises a secondary line extending parallel to each primary line (4-i) which encloses it over the associated coupling length ($L_c$) and surmounted by a metallised portion (6-j) connected to electrical supply means adapted to control the intensity of the current injected into said element.

10. Electro-optical device according to claim 2, wherein the element of the electro-optical control means comprises a secondary line extending parallel to each primary line which encloses it over the associated coupling length ($L_c$) and surmounted by a metallised portion connected to electrical supply means adapted to control the intensity of the current injected into said element.

11. Electro-optical device according to claim 10, wherein the primary lines and secondary lines are formed in a material substantially identical to the material which forms the upper confining layer.

12. Electro-optical device according to claim 10, wherein the confining and guide layers and the primary and secondary lines are formed in semiconductor materials.

13. Electro-optical device according to claim 12, wherein the confining layers are made from a binary semiconductor material, particularly of the intrinsic InP type, in that the guide layer is made of a quaternary semiconductor material lattice-matched with said binary material forming the confining layers, particularly of the intrinsic InGaAsP type, and in that the primary lines and secondary lines are formed in binary semiconductor materials, particularly of the p doped InP type.

14. Electro-optical device according to claim 10, wherein the primary lines and secondary lines are produced by a technique chosen from selective vapor or gas phase epitaxy, selective chemical attack and etching.

15. Electro-optical device according to claim 1, wherein the device comprises at least three primary lines separated two by two by at least one electro-optical control means respectively, said electro-optical control means being distributed along the primary lines according to a pattern chosen so that the part of the first mode can be transferred, under control, from one waveguide to the other.

16. Electro-optical device according to claim 1, wherein the first and second modes are of the symmetrical and antisymmetrical types, respectively.

* * * * *